July 24, 1934.  J. W. BRYCE  1,967,742
TABULATING MACHINE
Filed Feb. 25, 1931  5 Sheets-Sheet 1
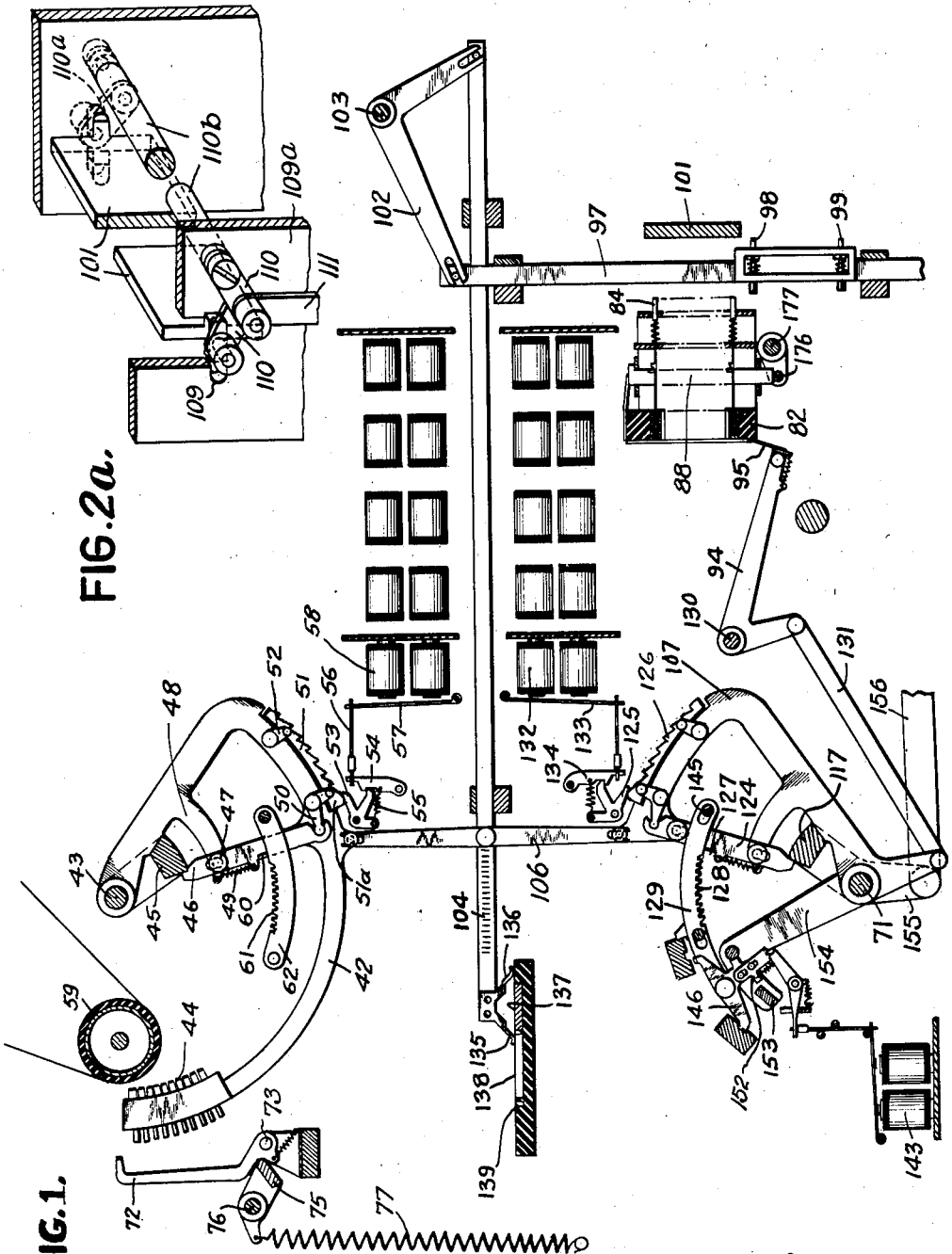

July 24, 1934.  J. W. BRYCE  1,967,742
TABULATING MACHINE
Filed Feb. 25, 1931   5 Sheets-Sheet 2
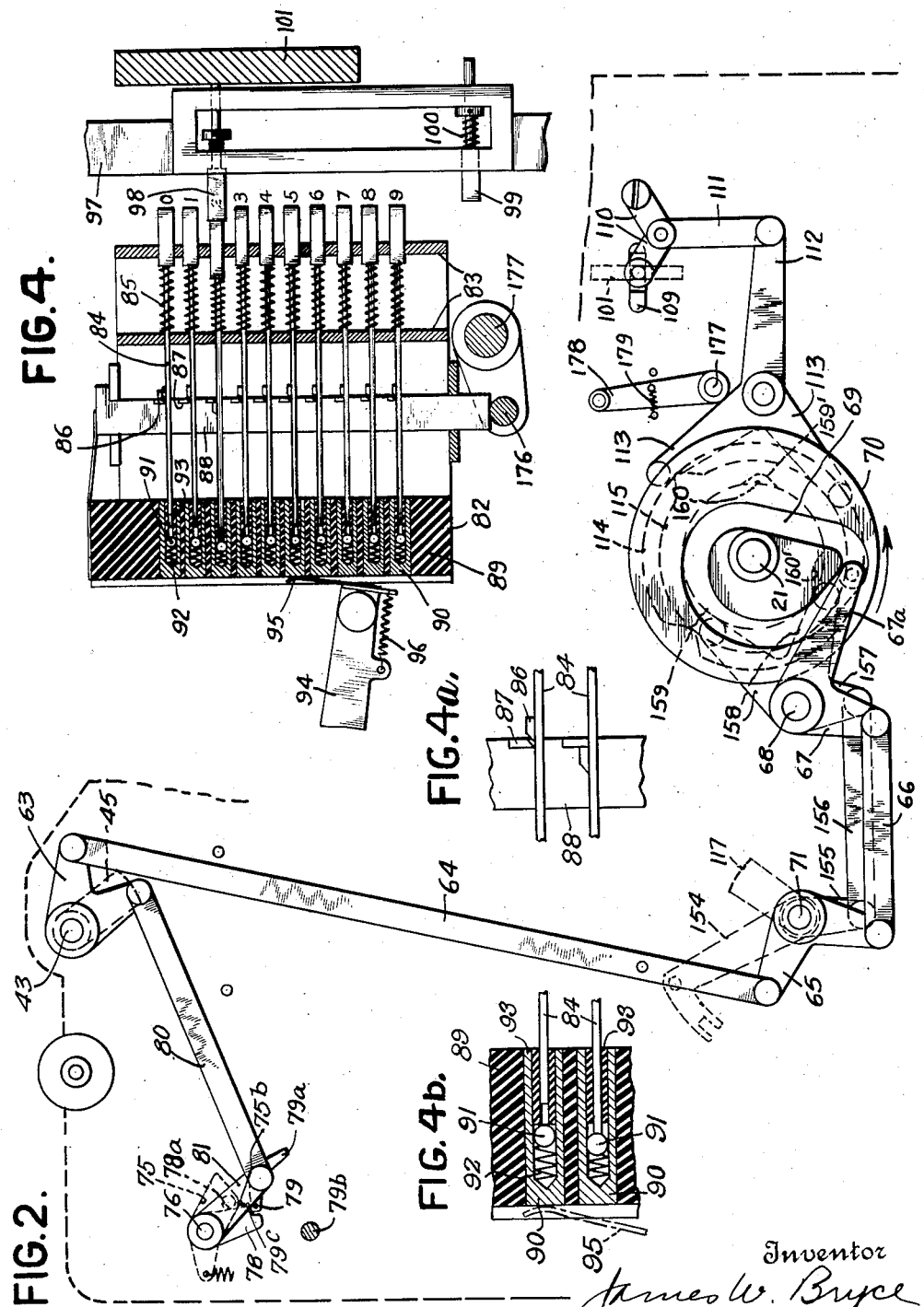

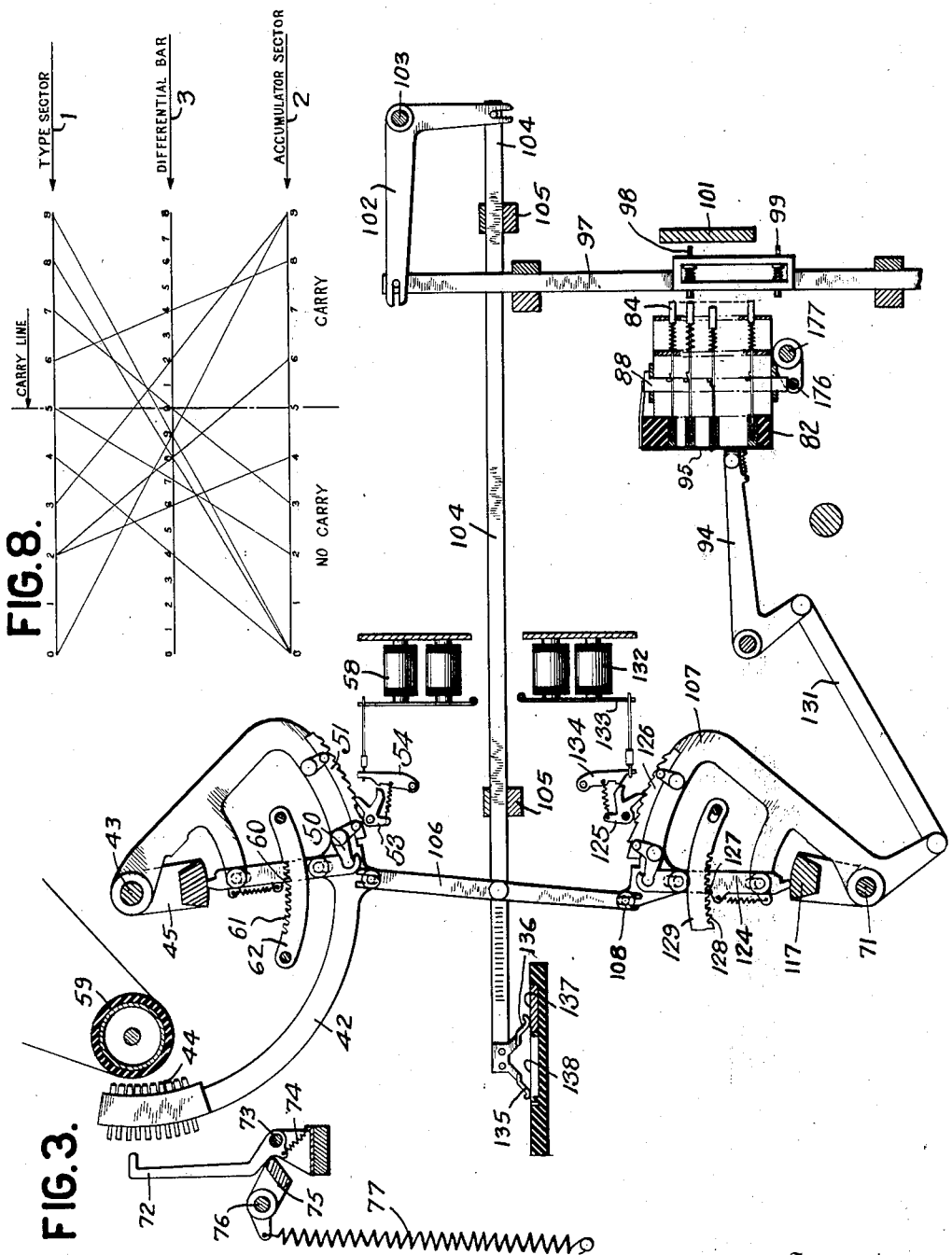

July 24, 1934.　　　　J. W. BRYCE　　　　1,967,742
TABULATING MACHINE
Filed Feb. 25, 1931　　　5 Sheets-Sheet 4
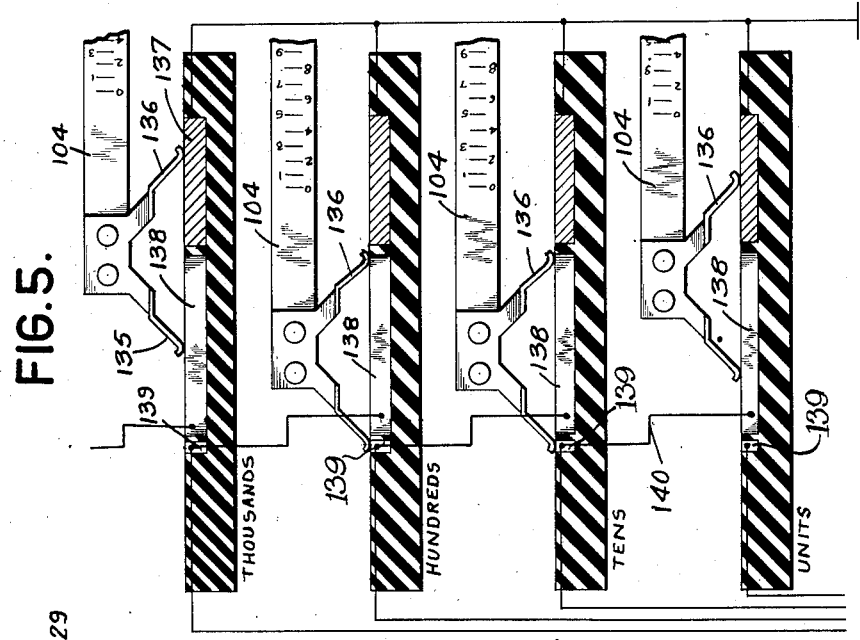
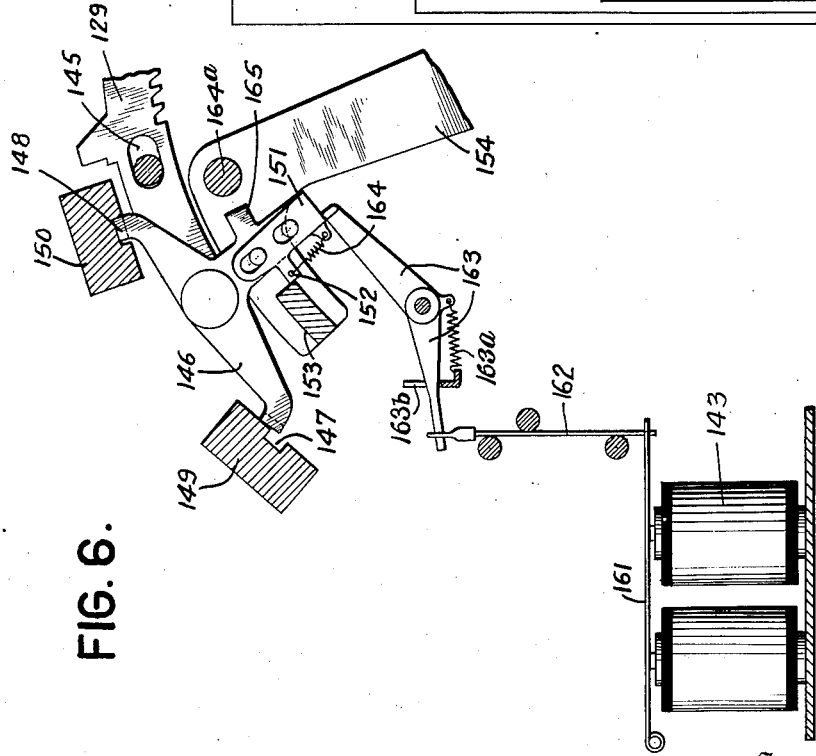

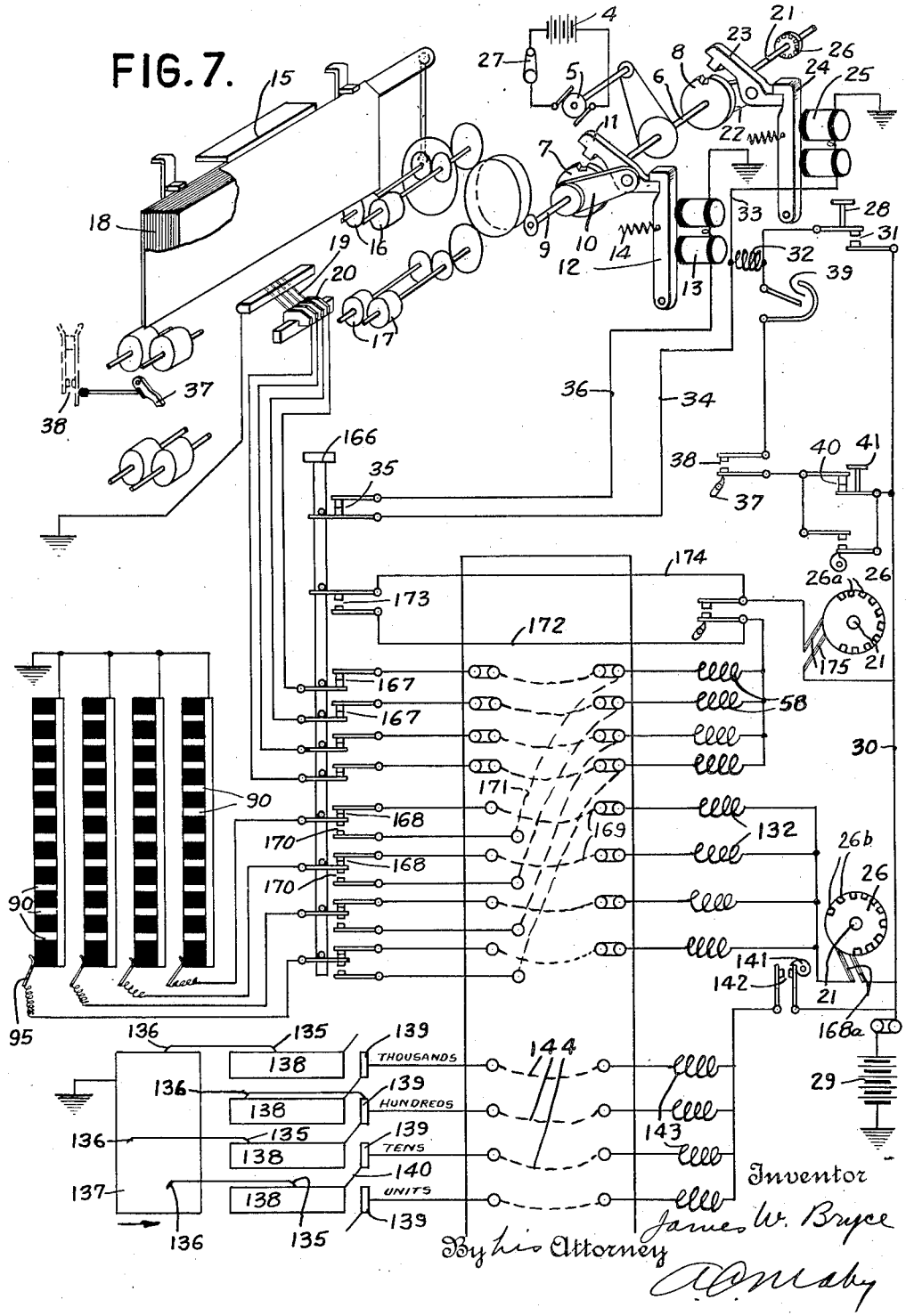

Patented July 24, 1934

1,967,742

UNITED STATES PATENT OFFICE 1,967,742

TABULATING MACHINE

James W. Bryce, Bloomfield, N. J., assignor, by mesne assignments, to International Business Machines Corporation, New York, N. Y., a corporation of New York Application February 25, 1931, Serial No. 518,055

13 Claims. (Cl. 235—58)

This invention relates to accounting machines and more particularly to electrically operated and controlled accounting machines.

One of the objects of the invention is to devise a new type of an accumulating device in which the well known accumulator pinions are dispensed with and electric contacts are employed to take the place of the pinions.

Another object is to devise means for sensing the value contained in the accumulator device and adding this value to a new value being run into the machine to ascertain the new sum or balance for the accumulator.

Another object is to devise means to effect the transfer or carry from one order in the accumulator to the next higher order.

Another object is to devise a carry means in which the carry is effected by stepping the parts backward instead of forward as is customary in most machines of this character.

Another object is to provide improved means for stopping the movement of the accumulating or printing sector at some point in its travel and locking the same at such point.

Another object is to provide means for taking a total of sums accumulated in the machine.

Another object is to provide means for clearing an accumulator of the character disclosed.

Other objects will appear from the description of the machine which follows:

Referring to the drawings:

Fig. 1 is a side elevation of the printing and accumulating mechanism for one column or order;

Fig. 2 is a detail of the driving mechanism for the machine;

Fig. 2a is a diagrammatic view of part of the mechanism shown in Fig. 2.

Fig. 3 is a view of the mechanism shown in Fig. 1 with the parts in different positions;

Fig. 4 is an enlarged detail of one order of the accumulator device showing the means for operating the same and the means for sensing the value contained therein;

Fig. 4a is a detail of latching mechanism shown in Fig. 4;

Fig. 4b is an enlarged detail of an electric contact device shown in Fig. 4.

Fig. 5 is an enlarged detail of the carry or transfer control device associated with four orders of the accumulator;

Fig. 6 is an enlarged detail of the carry or transfer mechanism shown in Fig. 1;

Fig. 7 is a wiring diagram;

Fig. 8 is a chart used to illustrate the principle upon which the machine operates.

In illustrating my invention, I have shown a machine which is adapted to be controlled by perforated cards. In this art as illustrated by the well known Hollerith perforated card controlled tabulating machines, record cards having a plurality of columns of index points are caused to pass through the machine one at a time. The cards pass under electric contact brushes, one brush for each column, and wherever a perforation appears at a particular point in a column on the card a corresponding brush reaches through the perforation, making contact with a plate on the other side of the card, thus closing an electric circuit through an electromagnet. The time at which a circuit is closed with respect to the card cycle determines the value to be printed or accumulated by the machine. This value, of course, depends upon the location of the perforation in the column.

It is customary in the Hollerith tabulating machines to feed the cards so that the "9" position in each column passes under the brush first, followed by the "8" position and so on down, the zero position passing under the brush last. For this reason, although it is possible with my device to reverse the feeding of the cards so that the "1" position will pass under the brushes first and so forth, I have elected to illustrate the machine by showing mechanism adapted to be controlled with the cards feeding "9" first as in the Hollerith machines.

The type sector for controlling listing and also for controlling the accumulator is adapted to move synchronously with the passage of successive index points on the card under their respective brushes. When a perforation passes under its brush the closing of an electric circuit will bring about stoppage of the corresponding type sector. This positions the proper type element in the printing line to effect printing upon the listing sheet. It also determines the amount to be added into the accumulator devices. When a value is already contained in the accumulator it is necessary to ascertain this value and to add it to the value now being run into the machine in order to ascertain the new sum to be set up in the accumulator. For this purpose a device is provided for sensing the value contained in the accumulator. This device for a given order is connected through a sector to an intermediate member which is also connected to the type sector. The intermediate member is thus adapted to be moved differentially under control of the type sector and the accumulator sector. The total movement of the intermediate or differential member represents the new value to be contained in that particular order of the accumulator. Wherever the amount represented by the position of the type sector plus that represented by the accumulator sector is more than nine, it is necessary to effect carrying of one into the next higher order of the accumulator. On the other hand, if this sum is nine or less, no carrying will be effected, excepting that when the sum of these two values is nine in a given order and one is carried into this order from the next lower order, it becomes necessary to effect carrying from this order into the next higher order.

The principle upon which my invention operates is disclosed in Fig. 8. Here the printing or type sector is represented by an arrow 1 pointing toward the left. The accumulator sector which is controlled by the old number contained in the accumulator is represented by an arrow 2 also pointing toward the left. The differential bar which is controlled by the type sector and the accumulator sector is shown by the intermediate arrow 3 which also points toward the left.

In accumulating a value the type sector 1 is adapted to move in the direction indicated by the arrow a distance corresponding to the value being run into the machine. The accumulator sector is adapted to move to the left a distance corresponding to the value already contained in that particular order of the accumulator. The differential bar 3 being connected to the printing sector and the accumulator sector will be moved to the left under control of both of the sectors and the distance which it is moved will represent the new value to be placed in the particular order of the accumulator. Being differentially connected midway between the sectors the differential bar will move half the distance of one of the sectors to receive a value equal to that represented by the movement of the sector. The upper line of figures represents the ten index point positions on the control card; or in other words, the various numerical values from zero up to nine which may be added in the particular order of the accumulator or printed on the corresponding column upon the listing sheet. The lower line of numerals represents the ten possible values contained in the particular order of the accumulator. The intermediate line of numerals shows the several points to which the differential bar may be moved under control of the type sector and the accumulator sector.

Thus, if the type sector 1 is moved to the left as far as the value nine and the accumulator sector is moved to the left as far as the value zero a line drawn from the upper nine to the lower zero will pass through the intermediate line of values at the point designated "9" as shown. In other words, the differential bar will be set at a position representing "nine".

The entering mechanism will then operate to register the value "nine" in the accumulator. Similarly, if there is nothing contained in the accumulator so that the sector 2 moves to the zero position and the type sector moves to a position representing any other value, a line drawn from such value to the lower zero will pass through the intermediate line of values at a point corresponding to the value or position at which the type sector stopped. If, on the other hand, a value is contained in the accumulator, as for instance, nine, the sector 2 will move until it reaches the nine position where it will be stopped. Assuming now that the type sector is moved to the "3" position to add three to the nine already contained in the machine and a line is drawn from the upper three to the lower nine. It will be seen that this line passes through the intermediate row of values at "2". Nine and three added together equal twelve so that two is the value to be entered in the accumulator of this particular order and it will be necessary to carry one to the next higher order. Assuming now that a line is drawn vertically through the upper and lower fives, it will be found that this line passes through a zero position in the intermediate line of values. It will also be seen that lines drawn from any upper value to any lower value will pass through the intermediate line of values to the right or left of the vertical dividing line or through the zero on this line.

It will also be seen that the values in the middle line to the left of the vertical dividing line run from zero to nine and those beginning at the vertical dividing line and extending to the right thereof run from zero to 8. If a line drawn from an upper value to a lower value passes through the differential line to the left of the carry line the value represented by the point at which the line passes through the differential line is the value to be registered in the accumulator and no carry is to be effected to the next higher order. On the other hand, if the line drawn from the upper row of values to the lower row passes through the differential line of values on or to the right of the carry line, the value indicated at the point of intersection is the value to be registered in the particular order of the accumulator and it will be necessary to effect a carry of one to the next higher order. Thus, if the values represented by the positions of the upper and lower sectors are two and six the resultant will be 8 to the left of the carry line and no carrying will be effected. The resultant of the adding of an upper six to a lower 8, on the other hand, is to the right of the carry line and one will have to be carried into the next higher order.

With this brief illustration of the principle upon which my invention is based a description of mechanism suitable for illustrating the manner in which the invention is carried out follows.

*Driving mechanism*

Referring to Fig. 7, the mechanism for operating the machine is diagrammatically shown along with the showing of the electric circuits. Here the source of power for operating the card feeding mechanism and for driving the various parts of the machine is represented by a source of electricity 4. An electric motor 5 is connected to the source to be operated thereby.

A main shaft 6 is connected to the motor shaft to be constantly driven by the motor while the latter is in operation. Fixed on this shaft are two clutch disks 7 and 8. Adjacent to the left end of the shaft 6 and coaxial therewith is a shaft 9 which when rotated operates the card feeding mechanism. Fixed on this shaft is an arm 10 carrying a clutch pawl 11 adapted to cooperate with a notch in the disk 7 so that a rotation of shaft 6 will effect rotation of the shaft 9. A latch 12 normally holds the clutch pawl 11 out of cooperation with the disk 7. Energization of an electromagnet 13 will actuate the latch 12 against the action of its spring 14 to release the pawl 11, permitting the latter to drop into cooperation with the disk 7 to thus effect rotation of shaft 9. The intermediate gear connection between shaft 9 and the card picker 15 and feed rollers 16, 17 will now cause cards to be fed from the stack 18 downwardly. The details of the construction of this card feeding mechanism are well known and will therefore not be brought out minutely here. As a card is fed downwardly each column of index point positions thereon will pass between one of the sensing brushes 19 and a corresponding contact plate 20 so that where a perforation appears at one of the index points in the particular column, a brush 19 will reach through the perforation and engage the contact plate 20 to close an electric circuit through a controlling electromagnet as will be described presently.

Adjacent to the right end of the shaft 6 and coaxial therewith is the main cam shaft 21 on which is fixed an arm 22 carried by clutch pawl 23 adapted to cooperate with a notch in the disk 8. A latch 24 normally holds the pawl 23 out of cooperation with the disk 8. An electromagnet 25 is adapted when energized to release the pawl 23 to cause the shaft 21 to rotate. The shaft 21 carries segment disks or drums 26 and the several operating cams shown in Fig. 2.

The discs 26 are provided with ten contact segments 26a corresponding with the ten index point positions on the card. Two brushes 175 mounted side by side are adapted to be simultaneously engaged by segments 26a successively and synchronously with the passage of the index points in a column on a card under the corresponding brush 19. The timing may be such that the brushes 175 disengage a segment 26a before the brush 19 disengages contact 20 so that sparking will not take place through a perforation in the card.

Starting the machine

Assuming that the motor switch 27 is closed and that the motor 5 is operating, in order to start the feeding of cards and the operation of the rest of the machine, the start switch or button 28 will be depressed. This will close a circuit from a battery or other source 29, through wire 30, contacts 31, electromagnet 32, wire 33, magnet 25 and back to the other side of the source, one side being illustrated as grounded in the present instance. This will operate the latch 24 to cause the cam shaft 21 to operate. Also, starting from the magnet coil 32 a circuit branches through wire 34, contacts 35 normally closed, wire 36, magnet 13 and back to the other side of the source. This operates latch 12 to cause the card feeding shaft 9 to operate. As soon as the cards commence feeding they will actuate a card lever 37 to close contacts 38. Also, the energization of magnet 32 causes closure of contacts 39 so that when the start key 28 is released a circuit will be maintained through the magnets 13, 25 and 32 by being shunted from wire 30 through contacts 40 normally closed, contacts 38 and 39 now closed, magnet coil 32 and from this point through the paths already described. As long as the cards continue to feed they will maintain the contacts 38 closed and this in turn will maintain the magnets 32, 25 and 13 energized so that the machine will continue to operate.

Should the cards fail to feed or after the last card has been fed through, the card lever 37 will permit the contacts 38 to open. This will cause magnets 32, 25 and 13 to become deenergized. Contacts 39 will then open and it will be necessary to depress the start key in order to restart the machine. If it is desired to stop the machine while the cards are being fed this will be effected by depression of the stop key 41 to open contacts 40 to break the circuit through the control magnets. Contacts 39 will immediately open so that the machine will not restart when the stop key is released.

Type sectors

The type carrying sectors 42 are loosely mounted side by side on a shaft 43 and are provided with the usual type elements 44. A bail 45 fixed on the shaft 43 reaches across all of the type sectors and is adapted when rocked counterclockwise to restore all of these sectors in their normal position as in Fig. 1. Means are provided to cause the clockwise movement of bail 45 to effect a similar movement of the sectors. For this purpose each sector is provided with a latch 46 attached by pin and slot 47 to arm 48 on the sector and actuated by a spring 49 into cooperation with the bail 45 as in Fig. 1. A bell crank 50 carried by the sector is attached to a ratchet bar 51 which is attached at its other end through arm 52 to the sector. The spring 49 in moving the latch to the position of Fig. 1 also rocks the bell crank and moves the ratchet bar 51 from the position of Fig. 3, to that of Fig. 1. Adjacent to the bar 51 is a pawl 53 pivotally carried by the frame or some other fixed part of the machine. A latch 54 normally holds the pawl out of engagement with the bar 51. A spring 55 is adapted to hold the latch in latching position and also to actuate the pawl when released so as to cooperate with the ratchet bar.

Latch 54 is connected by a wire 56 to the armature 57 of an electromagnet 58. In operation the shaft 43 with bail 45 engaging latch 46 as in Fig. 1 rocks clockwise synchronously with the passage of the record card through the machine so that as each perforation point in a column is passing under the brush 19, the corresponding type element 44 will be passing into printing position with respect to the platen 59. When a perforation appears under one of the brushes the magnet 58 will be energized and this in turn will actuate the latch 54 to release pawl 53 permitting it to rock into engagement with the ratchet bar 51.

As the bail 45 continues to press against the latch 46 the latter will be pulled downwardly by the ratchet bar 51 which is now held against further movement to the left. This lowers the latch 46 out of engagement with the bail 45 so that the later then moves on without the type sector as indicated in Fig. 3. The type bar will have been brought to rest with the type element 44 corresponding to the position of the perforation in the card, in printing position. A bent over projection or flange 60 on the latch 46 is adapted when the latch is depressed to cooperate with one of the several notches 61 in the locking bar 62. This locks the type sector in position until after printing has been effected; the latch 46 being held down by bail 45 until the latter is restored to the position of Fig. 1. When the sector 42 is restored the portion 51a of bar 51 will rock pawl 53 back to locking engagement with latch 54.

Thus, as the card is passing through the machine and is being analyzed a type bar 42 associated with any one of the columns will be stopped in a position corresponding to the location of the perforation in that particular column. After the last index points on the card have been fed past the sensing brushes 19 the printing hammers will operate to effect printing.

Operation of the type bar actuating bail

A bail 45 as stated is fixed on shaft 43. Also fixed on this shaft as shown in Fig. 2 is bell crank 63. A link 64 connected to this arm is connected at its lower end to a bell crank 65 which in turn is connected by a link 66 to an arm 67 pivoted at 68. Arm 67 is in the form of a bell crank the other arm 67a of which constitutes a cam follower provided with a roller cooperating with a cam groove 69 in a cam disk 70 fixed on shaft 21. The arm 65 is fixed on shaft 71. Rotation of shaft 21 thus actuates the chain of links and arms to rock the shaft 43, first in a clockwise direction and then in a counterclockwise direction back to normal position. The clockwise movement of shaft 43 is synchronous with the feeding of the card so that the several type elements 44 will be approaching printing position as their corresponding index point positions on the card are passing under the sensing brushes as previously stated. When the shaft 43 rocks counterclockwise to restore the bail 45 the latter will slide over the tops of the several latches 46 until the latter spring up into the position of Fig. 1. As the bail continues to move it will carry the type sector back to normal position as in Fig. 1.

Operation of the type hammers

The type hammers 72 are individually pivoted on a rod 73 and are held by a spring 74 in the position of Figs. 1 and 3 away from the type elements 44. A bail 75 pivoted at 76 and actuated by one or more springs 77 is provided to impel the hammers to effect printing. Fixed with respect to the bail 75 is an arm 78 cooperating with a pawl 79 carried by arm 81 as in Fig. 2. A link 80 is connected between the bell crank 63 and arm 81 loosely mounted with respect to the arm 78 and bail 75.

As the type sectors are being moved to their several printing positions the link 80 will be moving to the left, rocking the arm 78 clockwise and with it also the bail 75. This will move the bail 75 downwardly as viewed in Figs. 1 and 3 and will tension the spring 77. After the bail 45 has moved far enough to set the last of the type elements in printing line, the rear end 79a of pawl 79 will engage a pin 79b and be rocked to release the arm 78 and bail 75 permitting the spring 77 to rock the bail 75 counterclockwise until the arm 78 strikes pin 78a fixed with respect to the frame of the machine. This will rock all of the type hammers 72 with a quick movement against the type elements 44 that happen to be in printing line to effect printing. When the link 80 is restored toward the right the pawl 79 will be actuated by spring 79c to assume the position of Fig. 2 with respect to the arm 78 ready for the next cycle of operation. The bail 75 is stopped by pin 78a before the hammers strike the type; the hammers being carried by momentum the last part of their stroke and quickly withdrawn by their springs.

The accumulator

The accumulator 82 comprises a frame 83 carrying a plurality of columns of settable rods 84. There are ten of these rods to each column. The rods are pressed by springs 85 toward the right as viewed in Fig. 4 and may be moved to the left and latched in such position. Each rod is provided with a projection or shoulder 86 adapted to cooperate with a corresponding latching projection 87 on a latching bar 88. There is a latching bar for each column of rods 84 and each bar is provided with one latching projection 87 for each of the rods 84. The construction is similar to the key latching devices used in adding machines in that the setting of one rod 84 will raise the latching bar 88, thus releasing any rod that may have been previously latched to permit it to be restored by its spring to normal position.

The latching bar will then spring downwardly into position to lock the rod which has just been set. To the left of all of the rods 84 is an insulating block 89 in which are imbedded a plurality of contacts 90 one for each rod 84. The contacts 90 are bored to receive a ball 91 pressed toward the right by a spring 92 against an insulated sleeve 93 through which the rod 84 reaches. Normally the rod does not touch the ball 91 but when moved to the left it will touch the ball. This will effect a grounding of the corresponding contact 91 which is otherwise insulated from the rest of the machine.

An arm 94 is provided with a brush 95 actuated by a spring 96 so as to press against insulating block 89 and contacts 90. The arm 94 is adapted to be moved upwardly to cause the brush 95 to wipe over the ten contacts 90 of a column to locate the one which is grounded in order to ascertain the value contained in that particular order of the accumulator. The operation of this will be more fully described later. The manner in which the rods 84 are set is as follows: A plunger bar 97 is provided with two plungers 98, 99 normally held by springs 100 away from the right end of the rods 84. An operating plate 101 is adapted to be moved to the left to cooperate with one or the other of the plungers 98 in each column, moving it into cooperation with one of the rods 84 so as to set the latter. The plunger bar 97 is connected by a pin and slot to a bell crank 102 pivoted at 103 and in turn connected to a differential arm 104. Arm 104 is slidably mounted in supporting bearings 105. There is one differential bar for each order in the accumulator. Each differential bar is connected to a differential arm 106 at or near the middle thereof. Said arm is connected at its upper end through pin and slot to one of the type sectors 42 and at its lower end by pin and slot to an accumulator sector 107. The accumulator sector is shown in its normal position in Fig. 1.

Assuming that a card is being fed through the machine and the type sector 42 is moving clockwise but that the accumulator sector is not moving, it will be seen that the arm 106 will be actuated about the pin 108 as a fulcrum so as to move the differential bar 104 to the left a distance substantially half of that through which the type sector moves. This in turn will rock the bell crank 102 to lift the plunger bar 97 a proportional distance. Normally the plungers 98, 99 occupy the positions of Fig. 1. If the type sector moves far enough to place the uppermost type element 44 in printing line the plunger 98 will be raised into position back of the lowermost accumulator rod 84. This setting will be brought about by a perforation in the lowermost position in the corresponding column of the control card. This being the nine position as we have assumed, it will be seen that the uppermost type element 44 is the nine type and that the values are arranged downwardly to zero. It will also be seen that the lowermost accumulator rod 84 is the nine rod and that the uppermost rod represents zero. Thus, the nine perforation in the card effects a setting of the machine to print nine and to set up nine in the accumulator. The setting of the nine in the accumulator is then effected by movement of the operating plate 101 toward the left. This operation is effected as follows: The plate 101 is carried in slots 109 in the frame or side plates of the machine, and is adapted to be slid back and forth. Toggles 110 connected to the plate 101 and to the frame of the machine are connected by link or links 111 to arm or arms 112 for operation. It is, of course, to be understood that there should be two sets of toggle links 110, one on each end of the operating plate 101 and that the connection between these toggles and the means for operating the same will be such as to effect the simultaneous operation at both ends of the plate.

While those skilled in the art can readily supply the complete construction a diagrammatic view of this mechanism is shown in Fig. 2a. One of the arms 110 may be fixed on the rod 110b and the corresponding one of arms 110a also fixed on this rod so that the rocking of the rod through link 111 and arm 112 will cause operation of toggle arms 110, 110a. The arm 112 is shown integral with complementary cam follower arms 113 cooperating with complementary cams 114, 115 fixed on the cam shaft 21. The cams are timed to effect the operation of the plate 101 after the parts have been set.

The accumulator sector

The accumulator sectors 107 are all loosely mounted on the shaft 71. Fixed on this shaft is a bail 117 which actuates the sectors in the same way that bail 45 actuates the type sectors. Also fixed on shaft 71 (see Fig. 2) is the bell crank arm 65 as we have seen, so that the shaft will be rocked at the same time that the shaft 43 is rocked. This causes the bail to rock first in a counterclockwise direction and then in a clockwise direction back to its normal position. The latch 124 carried by the sector 107 causes the sector to move with the bail until the pawl 125 engages the ratchet bar 126 carried by the sector 107. The latch 124 will then be moved out of the path of the bail, permitting the latter to continue to move without moving the sector. A flange 127 will cooperate with notches 128 in the rack bar 129 to lock the sector in position. The bell crank arm 94 is loosely pivoted at 130 and is connected by a link 131 to a projection on the sector 107. At the beginning of a card cycle the bail 117 moves synchronously with the bail 45. This rocks the sector 107 to the left and raises the bell crank arm 94 causing the brush 95 to travel upwardly, wiping over the contacts 90 one after another until the sector is moved its full distance or until the brush 95 encounters a contact 90 which has been grounded by the locking of its rod 84 in set position. When the brush encounters the grounded contact it will cause energization of a corresponding electromagnet 132.

The circuit (Fig. 7) will be from the ground side of the source, through the particular contact 90, brush 95 of the order in question, contacts 168, plug connection 169, magnet 132 of the corresponding order, brushes 168a shown in tandem but actually arranged side by side in the machine so as to simultaneously engage first one and then the next of the segments 26b, and back to the other side of the source. This will actuate armature 133, moving the latch 134 to release the pawl 125 permitting it to cooperate with ratchet bar 126 to stop the sector 107. This will set the sector in position corresponding to the value of the grounded contact 90. Thus when the machine is receiving a value from a perforated card it is also analyzing the accumulator to ascertain the value contained therein. The resultant of the adding of these two values will then be set up in the accumulator and the value previously contained therein will be wiped out. Assuming that a particular column on the card is perforated in the nine position, when this position reaches the analyzing brush the electromagnet 58 will be energized causing the type sector 42 to be stopped with the uppermost or nine type 44 in printing position. The differential bar 104 will have been moved to the left by the sector 42 a distance substantially half of that moved by the sector and the plunger bar 97 will have been raised a proportional distance. Simultaneously with this operation the sector 107 will have moved to the left and assuming that no value was contained in the accumulator the sector will have moved its full distance, the brush 95 passing upwardly over the contacts 90 until it reaches the zero contact or in other words the upper limit of its stroke. This movement of the sector 107 will have effected an additional movement of the differential bar 104 and of the plunger bar 97. Thus in addition to the distance through which these parts were moved by the type sector they would have been moved further by the accumulator sector.

In the instance assumed the plunger 98 will have travelled completely past all of the rods 84 and the plunger 99 will have reached a position adjacent to the lowermost rod 84. Now when the plate 101 is moved to the left it will actuate the plunger 99 which in turn will set the lowermost rod 84 representing a value 9. This rod will be latched by the latching bar 88 so that the accumulator will contain the value "nine". The parts will then be restored to their normal positions ready for the next cycle of operation under control of the next perforated card. Assuming that the next card contains a perforation in the three position in the column in question the type sector will be stopped in the three position. The brush 95 on the other hand, upon engaging the lowermost contact 90 will cause energization of magnet 132, causing the accumulator sector to stop in corresponding position. Referring to the diagram in Fig. 8, it will be seen that the plunger bar 97 will have risen to bring the upper plunger 98 into register with the rod 84 representing the value 2. Then, when the plate 101 is actuated this plunger will set that rod 84, releasing the nine rod which had previously been set. It will be recognized here that this operation necessitates carrying one into the accumulator column of the next higher order and the manner in which this is done will now be described.

The carry operation

As previously pointed out in connection with Fig. 8, if the resultant of the adding of the old and new numbers occurs to the left of the carry line no carrying will be effected but if it occurs on the line or to the right thereof then carrying will be effected.

In the mechanism (Figs. 1 and 3), if the plunger bar 97 is set so that the plunger 98 is in position to actuate one of the rods 84, carrying will be effected but if the plunger 99 is set in position to actuate one of the accumulator rods then no carrying will be effected. The control of the carry operation is brought about by contact fingers 135, 136 carried by the differential bar 104. These fingers act as brushes cooperating with electric contacts 137, 138, 139. The brushes 135, 136 normally occupy the positions with respect to the contact plates 137, 138 shown in Fig. 1. When the plunger bar 97 has risen one step from the position of Fig. 1 to place the plunger 98 in the next position with respect to the accumulator rods 84 (with plunger 98 in line with the lowermost rod 84) the brushes 135, 136 will be moved to the left so that the brush 136 will engage contact plate 137 and the brush 135 will continue in engagement with contact plate 138. As shown in Fig. 7 the contact plate 137 is common to the brushes 136 of all of the accumulator orders while the contact plates 138 on the other hand are individual to the several accumulator orders. It will also be seen here that the contacts 139 are individual to the several orders and that each contact 139 is connected by a wire 140 to the plate 138 of the next lower order. Thus, in the example assumed in which the value 3 is added to 9 which was previously in the accumulator, the plunger bar 97 is raised so that the upper plunger 98 effects the setting of the accumulator rod and the differential bar 104 of this the units order is moved to a position in which the brush 135 still is in contact with plate 138 and brush 136 is still in contact with plate 137. This condition is represented by the lowermost brushes 135, 136 in Fig. 7 (omitting for the moment the tens, hundreds, and thousands order brushes 135, 136). A cam 141 (Fig. 7) which may be carried on the shaft 21 is timed to close contacts 142. At this time a circuit will be established through any of the brushes 135, 136 that bridge the gap between contact plates 137, 138 as follows: from a source 29 through contacts 142, electromagnet 143, in the present instance, the second one from the bottom in Fig. 7, which is the tens order, then through plug line 144 to contact 139, wire 140, contact plate 138 of the units order, brushes 135, 136, plate 137 and back to the other side of the source through the ground.

The energization of magnet 143 then effects carrying or adding of one into its accumulator order. The mechanism for effecting the carrying is as follows: The rack 129 to which the accumulator sector 107 is locked is slidably mounted by pins and slots 145, the pins being fixed to some part of the machine frame so that the bar can be moved to the right as viewed in Fig. 1. A rocking arm 146 (see also Fig. 6) is attached to the bar 129 and may be brought into engagement with notches 147, 148 in blocks 149, 150 fixed in the machine. Normally the arm 146 is locked in the notch 147. When all of the accumulator sectors 107 have been set and latched to their respective bars 129, if any bar 129 is moved to the right from the position of Fig. 1 to that of Fig. 6 it will carry its sector backward one notch and this in turn will move the differential bar 104 and also the plunger bar 97 back one step lowering the plungers 98, 99 so that whichever plunger is in position to actuate an accumulator rod 84, that one will be lowered one step to position to actuate the next rod which in this instance represents a value of one more than the one above it where the plunger had beeen. Or, where plunger 99 is in the "9" position it will be moved out of position and plunger 98 will be moved to zero position. In the example assumed where three is being added to nine already in the units order of the accumulator and nothing is being added in the tens order or column the type sector 42 of the tens order will have moved its full distance to the left bringing the lowermost or zero type into printing position and the accumulator sector 107 will have moved its full distance to the left and this in turn will have raised the plunger bar 97 to its uppermost position with the plunger 99 in zero position.

When the carry magnet 143 effects a backward step of the accumulator sector 107 of the tens order it will lower the plunger bar 97 one step thus moving the plunger 99 back into cooperation with the "1" rod 84 so that when the plate 101 is actuated this rod will be set to represent the value one. We will then have a value one in the tens order of the accumulator and the value of two in the units order so that the accumulator will contain a value 12 which is the sum of nine plus 3.

Slidably mounted on the rock arm 146 is a plate 151 having a projection 152 adapted to be moved into and out of the path of a bail or rod 153 integral with arm 154. This arm is loose on shaft 71 (see Fig. 2) and has an opposite projection 155 connected by a link 156 to an arm 157 loosely pivoted at 68 and integral with complementary cam follower arms 158 cooperating with complementary cams 159, 160. The depressed portion 160' of cam 160 is adapted to cooperate with the upper follower arm 158 when the raised portion 159' of cam 159 cooperates with the lower arm 158. This will cause the arms 158, 157 to rock clockwise. Then, as the upper follower arm 158 rides out of the depression 160', the lower arm 158 will ride inwardly from a projection 159' thus causing the arms 158, 157 to rock counterclockwise back to their original position. At the proper time for carrying operation the cams will actuate their followers to rock the arms 154 with the rod 153 to the right as viewed in Fig. 6. Normally the projections 152 associated with each bar 129 is out of the path of the rod 153 but when the carry magnet 143 is energized it will actuate its armature 161 and through rod 162 and arms 163 will move the plate 151 against the action of its spring 164 to move the projection 152 into the path of the rod 153 so that when the arm 154 moves to the right it will rock the arm 146 counterclockwise out of the notch 147, pushing the arm 146 and with it the bar 129 to the right until the arm engages in notch 148. The movement of the bar 129 toward the right will cause the latch 124 associated with that particular arm 129 to be moved one step to the right and this in turn moves the corresponding accumulator sector 107 to set the plunger bar 97 back one step as described. A spring 163a connected at one end of the integral arms 163 and at the other end to a guide frame member 163b serves to restore the arms 163 to normal position. It should be noted that where sector 107 is carried to its zero position it will be stopped by magnet 132 in the usual manner; latch 124 moving out of the path of bail 117 and into cooperation with bar 129.

As soon as the contacts 142 open and the magnets 143 are deenergized the plate 151 will be restored by its spring to its normal position. The arms 154 in their operation move to the right for a very short time and are then restored to normal position to the left. The restoration may be timed to take place immediately after the plate 101 has actuated the plungers to set the accumulator rods 84. The restoration of the arms 154 may then restore the rocker arm 146 and latching bar 129 to the left to normal position. For this purpose a rod 164a is adapted to engage a projection 165 on the rocker arm 146 to rock the latter out of the notch 148 moving it to the left with bar 129 until it engages in the notch 147.

Assuming that a number is being added under control of a record card into the accumulator; that the hundreds order of the accumulator contains the value nine and that nothing is being added under control of the record card in this particular (hundreds) order; referring to the diagram (Fig. 8) it will be seen that the accumulator sector of the hundreds order will be stopped in the "9" position and that the corresponding type sector will move to the zero position. This will cause the differential bar and the plunger bar of the machine to move to the nine position represented by the 9 to the left of the carry line in Fig. 8. Ordinarily then, there will be no carrying from this order to the next higher order. However, in the event that one is carried from the tens order to the hundreds order it will then be necessary to change the value "9" registered in the hundreds order to zero and to carry one from this order to the thousands order. This is effected by providing the contacts 139. Movement of the differential bar up to the value represented by the carry line of Fig. 8 causes the brushes 135, 136 to continue to bridge the gap between contact plates 137, 138 to effect normal carrying.

When the differential bar moves one step further to the nine position the brushes 135, 136 will then bridge the gap between contacts 138, 139 as illustrated in the hundreds order in Figs. 5 and 7. Referring to the diagram (Fig. 7), where one is carried from the tens order to the hundreds order, the circuit is from the ground side of the source through contact plate 137, brushes 135, 136 in the tens order, contact plate 138 of the tens order, contact 139 of the hundreds order, plug wire 144 of the hundreds order, magnet 143 of the hundreds order, contacts 142 and back to the other side of the line. Returning to the contact 139 of the hundreds order it will be seen that the circuit coming from the ground side branches here, passing through contacts 135, 136 of the hundreds order into contact plate 138 of the hundreds order then to contact 139 of the thousands order, through plug line 144 of the thousands order, transfer magnet 143 of the thousands order, contacts 142 and back to the other side of the line. The energization of the transfer magnet 143 of the thousands order will, as described in connection with Fig. 1, cause the accumulator sector 107 of that order to be stepped back one notch in the usual manner. Also, previous to the carrying operation, the plunger 99 will have been set adjacent to the nine or lowermost accumulator rod 84. When one is carried into the hundreds order, stepping the sector 107 back one notch, plunger bar 97 will be lowered a corresponding distance, moving the plunger 99 out of register with the nine accumulator rod 84 and moving the plunger 98 into register with the uppermost or zero rod 84. Then when the operating plate 101 is actuated the zero rod 84 will be set, effecting the release of the nine rod so that this order will then contain zero.

Total taking

In taking a total of a value contained in the accumulator the machine will be operated without the feeding of cards. This operation will be effected by depressing the total key 166 and then the start key 28. Depression of the total key opens contacts 35 to prevent the closing of a circuit through the card feed magnet 13. The circuit will, however, be closed through the magnet 25 causing the shaft 21 to rotate for the taking of the total.

Depression of the total key also effects opening of all the contacts 167 between the contact plates 20 and the printing magnets 58. Normally contacts 168 are closed between the brushes 95 and the magnets 132 through plug line 169, etc. to control the setting of the accumulator sector. Depression of the total key opens all of the contacts 168 and closes contacts 170 thus closing circuits from the brushes 95 through contacts 170, plug lines 171, printing magnets 58, wire 172, contacts 173 also closed by the total key, wire 174, brushes 175, line 30 and back to the other side of the source.

The type sectors 42 and the accumulator sectors 107 will operate in the usual manner. The brushes 95 will wipe over the contacts 90 synchronously with the movement of the type sectors. When a brush 95 engages a contact 90 corresponding to a set accumulator rod 84, a circuit will be closed through the contact 90 to the ground thus closing the circuit at this moment through the corresponding printing magnet 58. This in turn will stop the type sector 42 in position to print the value contained in that particular order of the accumulator.

Clearing the accumulator

In order to clear the accumulator of all the values contained therein a bail 176 fixed on shaft 177 reaches across the lower edges of all of the latching bars 88. Fixed on shaft 177 is a crank 178 normally held by a spring 179 in its inoperative position. By turning the crank slightly in a clockwise direction, the bail 176 will raise all of the latching bars 88, releasing all of the rods 84 that are in set position and permitting them to be restored by their springs to normal positions.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. For instance, while I have contemplated feeding the cards so as to sense the index point positions in the descending order, this may be reversed and the index points sensed in the ascending order. The type 44 may then be arranged with the zero type at the top and the "9" type at the bottom and the accumulator rods 84 may be arranged in the reverse order or the plunger bar 97 may progress downwardly instead of upwardly. It is the intention, therefore, to be limited only as indicated by the scope of the following claims:—

I claim:

1. In an accumulating machine, a movable value receiving member, a register, a movable member differentially positioned under control of said register, means for controlling the entering of values into the register, said means being differentially positioned by both of said movable members when controlling such entering.

2. In combination, a register, a movable type carrier, a movable member controlled by said register, and means differentially positioned jointly by said carrier and said member under control of the register for controlling the entry of values into the register.

3. In an accounting machine, a movable value receiving member, means controlled by perforated records for controlling said member, a register, a second movable member controlled by said register in accordance with the value contained therein, and an intermediate device connected to and differentially positioned by both of said members jointly for controlling the entering of values into said register in accordance with such joint control.

4. In combination, a register, a movable type carrier, means controlled by perforated records for controlling the setting of said carrier, a movable member controlled by said register in accordance with the value contained therein, and means connected to and differentially positioned by said carrier under control of a card and said member under control of the register for controlling the entering of data into said register.

5. In combination, a register, a movable type carrier, means controlled by perforated records for controlling a setting of said carrier, a movable member controlled by said register in accordance with the value contained therein, and means connected to and differentially positioned by said carrier and said member for clearing the register of data and for entering a new value therein.

6. A register comprising a plurality of orders of settable elements, a plunger bar associated with each of said orders of elements, a plurality of plungers carried by each bar, said bar being movable with respect to the elements so as to position one of the plungers in cooperative relation with any of said elements for effecting an entry into such order, and means controlled in accordance with the position of said bar for effecting a carry operation into the next higher order of elements.

7. An accumulating device comprising a plurality of orders of electric contacts, differentially movable means adapted to control the setting of said contacts, and means controlled by said movable means for effecting a carry operation to the contacts of the next higher order.

8. In an accounting machine, a register, a plurality of electric contacts associated with said register, a device controlled through said contacts in accordance with a value contained in the register, means for receiving a new value to be added, differentially adjustable entering means controlled by said device and said receiving means for effecting the setting of said contacts, and means for causing the machine to take a total under control of said contacts.

9. In combination, a register, a plurality of movable members associated with each order of the register, one of said members being movable in accordance with a value to be entered in the register, another of said members being movable under control of the register in accordance with a value contained therein, a differential bar controlled by both of said members adapted to effect the entry of a value into the register, and means controlled by the position of the differential bar of one order for effecting a stepping back of one of the members associated with the next higher order for effecting a carry operation.

10. In combination, a register, a plurality of movable members associated with each order of the register, a differentially movable device controlled by the members associated with each order for effecting the entry of a value into each order of said register, and means controlled by said differentially movable device when in one position for effecting a normal carry operation to the next higher order of the register, and when in another position for effecting a carry operation to the next higher order when one is carried from the next lower order.

11. An accumulating device comprising a plurality of orders of electric circuit contacts, differentially movable means for selectively closing the contacts in an order and for simultaneously causing opening of any closed contacts in such order, value entering means, and means differentially controlled by said contacts and said value entering means for controlling the operation of said selective means.

12. In combination with an accumulating device, a swinging sector adapted to be set in accordance with a value received, a second swinging sector adapted to be set under control of said device in accordance with a value contained therein and means differentially controlled by said sectors in accordance with a value received and a value contained in said device for effecting the entry of a new value in the device.

13. In combination with an accumulating device, a swinging sector adapted to be set in accordance with a value received, a second swinging sector adapted to be set under control of said device in accordance with a value contained therein, means differentially controlled by said sectors for effecting the entry of a new value in the device and means for effecting a further setting of one of said sectors for effecting a carry operation.

JAMES W. BRYCE.